US008147026B2

(12) United States Patent
Rimai et al.

(10) Patent No.: US 8,147,026 B2

(45) **Date of Patent: *Apr. 3, 2012**

(54) IMAGE QUALITY MATCHING IN A MIXED PRINT ENGINE ASSEMBLY SYSTEM

(75) Inventors: Donald S. Rimai, Webster, NY (US); Alan E. Rapkin, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/430,264

(22) Filed: Apr. 27, 2009

(65) Prior Publication Data

US 2010/0271417 A1 Oct. 28, 2010

(51) Int. Cl.

| | |
|---|---|
| ***B41J 29/393*** | (2006.01) |
| *B41J 29/38* | (2006.01) |
| *G01N 21/00* | (2006.01) |
| *G01N 21/55* | (2006.01) |
| *G01N 21/47* | (2006.01) |
| *G06F 3/12* | (2006.01) |
| *G06F 15/00* | (2006.01) |
| *G03G 15/00* | (2006.01) |

(52) U.S. Cl. .............. 347/19; 347/6; 356/432; 356/433; 356/434; 356/435; 356/445; 356/446; 356/447; 356/448; 358/1.15; 358/1.9; 399/49; 399/72; 399/74

(58) Field of Classification Search ................ 347/6, 19; 356/432–435, 445–448; 358/1.15, 1.9; 399/49, 399/72, 74

See application file for complete search history.

(56) References Cited

U.S. PATENT DOCUMENTS

| | | | | |
|---|---|---|---|---|
| 5,508,826 | A * | 4/1996 | Lloyd et al. | 358/501 |
| 5,691,817 | A * | 11/1997 | Cargill et al. | 356/405 |
| 6,144,024 | A | 11/2000 | Rushing | |
| 6,222,176 | B1 | 4/2001 | Rushing et al. | |
| 6,225,618 | B1 | 5/2001 | Rushing et al. | |
| 6,229,972 | B1 | 5/2001 | Rushing | |
| 6,331,832 | B1 | 12/2001 | Rushing | |
| 6,337,958 | B1 * | 1/2002 | Stanich et al. | 399/49 |
| 6,567,171 | B1 | 5/2003 | Rushing | |
| 6,671,052 | B1 | 12/2003 | Rushing | |
| 6,791,485 | B1 | 9/2004 | Rushing | |
| 7,162,172 | B2 * | 1/2007 | Grace et al. | 399/49 |
| 7,245,856 | B2 | 7/2007 | Furst et al. | |
| 7,349,124 | B2 * | 3/2008 | Zuber | 358/1.9 |

(Continued)

*Primary Examiner* — Laura Martin
*Assistant Examiner* — Jeremy Bishop
(74) *Attorney, Agent, or Firm* — Donna P. Suchy; Christopher J. White

(57) ABSTRACT

A method and system for improved image quality using an image quality matching method is used to match the optical density of single prints produced on multiple print engines by first sensing the optical density of a first image produced on a first print engine and then sensing the optical density of a second image produced on a second print engine before comparing the optical densities and determining if they are substantially equal. If they are not equal set points and exposures are adjusted on one or both print engines until the differences between the optical densities is less than 0.05, preferably 0.03. The density is changed by adjusting the initial voltage on the primary imaging member of at least one print engine and/or by adjusting the exposure of the primary imaging member of at least one print engine.

17 Claims, 4 Drawing Sheets

U.S. PATENT DOCUMENTS

2006/0238778 A1* 10/2006 Mongeon et al. .............. 358/1.4
2007/0052996 A1* 3/2007 Ota .............................. 358/1.15
2007/0263238 A1* 11/2007 Lieberman et al. ............ 358/1.9
2008/0018693 A1* 1/2008 Huang et al. .................... 347/19
2008/0074477 A1* 3/2008 Schmitt ........................... 347/76
2009/0303484 A1* 12/2009 Hofeldt et al. ................ 356/431

* cited by examiner

IMAGE QUALITY MATCHING IN A MIXED PRINT ENGINE ASSEMBLY SYSTEM

CROSS REFERENCE TO RELATED APPLICATIONS

This application relates to commonly assigned, copending U.S. application Ser. No. 12/430,256 (U.S. Publication No. 2010/0271643), filed Apr. 27, 2009, entitled: "IMAGE QUALITY MATCHING IN A PRINT ENGINE ASSEMBLY SYSTEM."

FIELD OF INVENTION

This invention relates to a printing system including a plurality of print engines, at least one of which is a digital print engine using electrophotographic technology, and specifically to image quality matching in a print engine assembly system.

BACKGROUND OF THE INVENTION

In typical commercial reproduction apparatus (electrographic copier/duplicators, printers, or the like), a latent image charge pattern is formed on a primary imaging member (PIM) such as a photoreceptor used in an electrophotographic printing apparatus. While the latent image can be formed on a dielectric PIM by depositing charge directly corresponding to the latent image, it is more common to first uniformly charge a photoreceptive PIM member. The latent image is then formed by area-wise exposing the PIM in a manner corresponding to the image to be printed. The latent image is rendered visible by bringing the primary imaging member into close proximity to a development station. A typical development station may include a cylindrical magnetic core and a coaxial nonmagnetic shell. In addition, a sump may be present containing developer which includes marking particles, typically including a colorant such as a pigment, a thermoplastic binder, one or more charge control agents, and flow and transfer aids such as submicrometer particles adhered to the surface of the marking particles. The submicrometer particles typically include silica, titania, various lattices, etc. The developer also typically includes magnetic carrier particles such as ferrite particles that tribocharge the marking particles and transport the marking particles into close proximity to the PIM, thereby allowing the marking particles to be attracted to the electrostatic charge pattern corresponding to the latent image on the PIM, thereby rendering the latent image into a visible image.

The shell of the development station is typically electrically conducting and can be electrically biased so as to establish a desired difference of potential between the shell and the PIM. This, together with the electrical charge on the marking particles, determines the maximum density of the developed print for a given type of marking particle.

The image developed onto the PIM member is then transferred to a suitable receiver such as paper or other substrate. This is generally accomplished by pressing the receiver into contact with the PIM member while applying a potential difference (voltage) to urge the marking particles towards the receiver. Alternatively, the image can be transferred from the primary imaging member to a transfer intermediate member (TIM) and then from the TIM to the receiver.

The image is then fixed to the receiver by fusing, typically accomplished by subjecting the image bearing receiver to a combination of heat and pressure. The PIM and TIM, if used, are cleaned and made ready for the formation of another print.

A printing engine generally is designed to generate a specific number of prints per minute. For example, a printer may be able to generate 150 single-sided pages per minute (ppm) or approximately 75 double-sided pages per minute with an appropriate duplexing technology. Small upgrades in system throughput may be achievable in robust printing systems. However, the doubling of throughput speed is mainly unachievable without a) purchasing a second reproduction apparatus with throughput identical to the first so that the two machines may be run in parallel, or without b) replacing the first reproduction apparatus with a radically redesigned print engine having double the speed. Both options are very expensive and often with regard to option (b), not possible.

Another option for increasing printing engine throughput is to utilize a second print engine in series with a first print engine. For example, U.S. Pat. No. 7,245,856 discloses a tandem print engine assembly which is configured to reduce image registration errors between a first side image formed by a first print engine, and a second side image formed by a second print engine. Each of the '856 print engines has a seamed photoreceptive belt. The seams of the photoreceptive belt in each print engine are synchronized by tracking a phase difference between seam signals from both belts. Synchronization of a slave print engine to a main print engine occurs once per revolution of the belts, as triggered by a belt seam signal, and the speed of the slave photoreceptor and the speed of an imager motor and polygon assembly are updated to match the speed of the master photoreceptor. Unfortunately, such a system tends to be susceptible to increasing registration errors during each successive image frame during the photoreceptor revolution. Furthermore, given the large inertia of the high-speed rotating polygon assembly, it is difficult to make significant adjustments to the speed of the polygon assembly in the relatively short time frame of a single photoreceptor revolution. This can limit the response of the '856 system on a per revolution basis, and make it even more difficult, if not impossible, to adjust on a more frequent basis.

Color images are made by printing separate images corresponding to an image of a specific color. The separate images are then transferred, in register, to the receiver. Alternatively, they can be transferred in register to a TIM and from the TIM to the receiver or they may be transferred separately to a TIM and then transferred and registered on the receiver. For example, a printing engine assembly capable of producing full color images may include at least four separate print engines or modules where each module or engine prints one color corresponding to the subtractive primary color cyan, magenta, yellow, and black. Additional development modules may include marking particles of additional colorants to expand the obtainable color gamut, clear toner, etc., as are known in the art. The quality of images produced on different print engines can be found to be objectionable if produced on different print engines even if the print engines are nominally the same, e.g. the same model produced by the same manufacturer. For example, the images can have slightly different sizes, densities or contrasts. These variations, even if small, can be quite noticeable if the images are compared closely.

It is clearly important that certain image quality attributes, including size, print density, and contrast match for prints made on separate print engines if those prints are subject to close scrutiny, as would be the case when a print made on a receiver sheet is produced on separate print engines. Specifically, the reflection density and the contrast of the prints need to closely match or the prints will be found to be objectionable to a customer. Even prints produced on two nominally identical digital printing presses such as electrophotographic printing presses described herein can vary in density and contrast due to variations in the photo-response of the PIM, variations in the charge or size of the marking particles, colorant dispersion variations within the batches of marking particles used in the separate engines, etc. It is clear that a method is needed to allow comparable prints to be produced on a plurality of engines.

SUMMARY OF THE INVENTION

According to this invention, the density of images produced on coupled digital printing engines including at least one digital print engine, preferably an electrophotographic digital print engine, are matched. The exposure, the initial potential on the PIM, and the bias on the development station shell are adjusted. The initial potential on the PIM is adjusted by varying the bias on the primary charging member. The primary charging member is a grid controlled corona charger. The initial potential on the PIM is adjusted by varying the DC bias on the grid of the grid controlled corona charger. Specifically, by increasing the magnitude of the bias on the grid, the initial potential on the PIM is increased. Conversely, if it is desired to decrease the bias on the PIM, the magnitude of the bias of the grid of the corona charger is decreased. If the primary charging member is a device such as a roller charger, the initial charge on the PIM is adjusted by varying the bias on the roller charger. Adjustment of the bias on the development station is a preferred method to shift the density of the entire image uniformly when necessary.

If it is desirable to uniformly change density of the print in a digital electrophotographic print engine, this is most effectively accomplished by changing the bias on the development roller. Such a change simply shifts the difference of potential between the development station and the electrostatic latent image bearing PIM, thereby uniformly affecting the deposition of marking particles across all densities. Conversely, altering the contrast of the print can be done by changing the initial potential of the primary imaging member because, as is well known, the photodecay of the charge on the photoreceptor is highly nonlinear with potential. This is because, at higher potentials, the electron-hole pairs produced upon absorption of a photon are more likely to separate, thereby precluding geminate recombination. If it is desired to maintain the density and change the contrast, the bias on the development station would have to also be adjusted to maintain the same difference of potential as prior to the adjustment of the potential on the PIM prior to changing the initial bias of the PIM at the density chosen to remain constant.

Figure 1:
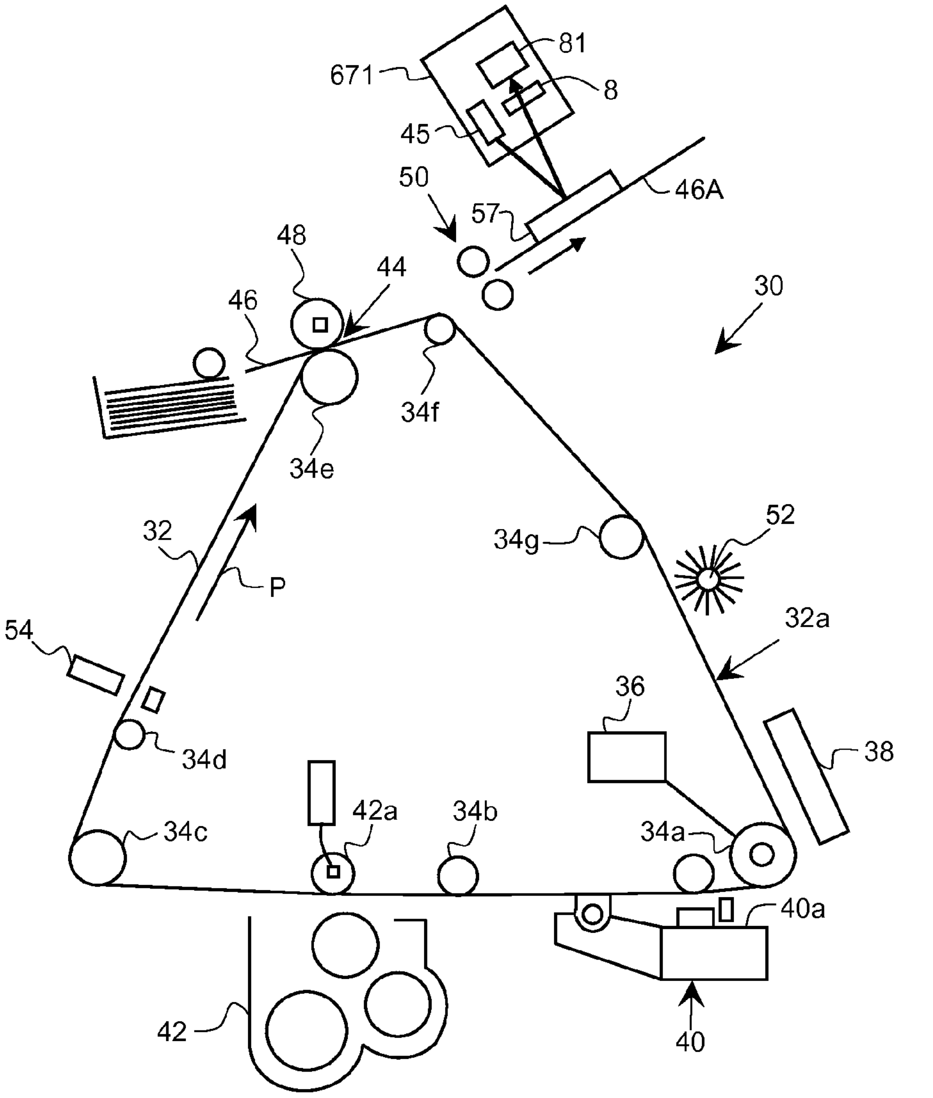
FIG. 1 schematically illustrates an embodiment of an electrophotographic print engine.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION OF THE INVENTION

FIG. 1 schematically illustrates an embodiment of an electrophotographic print engine 30. The print engine 30 has a movable recording member such as a photoreceptive belt 32, which is entrained about a plurality of rollers or other supports 34*a* through 34*g*. The photoreceptive belt 32 may be more generally referred-to as a primary imaging member (PIM) 32. A primary imaging member (PIM) 32 may be any charge carrying substrate which may be selectively charged or discharged by a variety of methods including, but not limited to corona charging/discharging, gated corona charging/discharging, charge roller charging/discharging, ion writer charging, light discharging, heat discharging, and time discharging.

One or more of the rollers 34*a*-34*g* are driven by a motor 36 to advance the PIM 32. Motor 36 preferably advances the PIM 32 at a high speed, such as 20 inches per second or higher, in the direction indicated by arrow P, past a series of workstations of the print engine 30, although other operating speeds may be used, depending on the embodiment. In some embodiments, PIM 32 may be wrapped and secured about a single drum. In further embodiments, PIM 32 may be coated onto or integral with a drum.

It is useful to define a few terms that are used in relation to this invention. Optical density is the log of the ratio of the intensity of the input illumination to the transmitted, reflected, or scattered light, or $D=\log(I_i/I_o)$ where D is the optical density, $I_i$ is the intensity of the input illumination, $I_o$, is the intensity of the output illumination, and log is the logarithm to the base 10. Thus, an optical density of 0.3 means that the output intensity is approximately half of the input intensity which is desirable for quality prints.

For some applications, it is preferable to measure the intensity of the light transmitted through a sample such as a printed image. This is referred to as the transmission density and is measured by first nulling out the density of the substrate supporting the image and then measuring the density of the chosen region of the image by illuminating the image through the back of the substrate with a known intensity of light and measuring the intensity of the light transmitted through the sample. The color of the light chosen corresponds to the color of the light principally absorbed by the sample. For example, if the sample consists of a printed black region, white light would be used. If the sample was printed using the subtractive primary colors (cyan, magenta, or yellow), red, green, or blue light, respectively, would be used.

Alternatively, it is sometimes preferable to measure the light reflected or scattered from a sample such as a printed image. This is referred to as the reflection density. This is accomplished by measuring the intensity of the light reflected from a sample such as a printed image after nulling out the reflection density of the support. The color of the light chosen corresponds to the color of the light principally absorbed by the sample. For example, if the sample consists of a printed black region, white light would be used. If the sample was printed using the subtractive primary colors (cyan, magenta, or yellow), cyan, magenta, or yellow light, respectively, would be used.

A suitable device for measuring optical density is an X-Rite densitometer with status A filters. Some such devices measure either transmission or reflected light. Other devices measure both transmission and/or reflection densities. Alternatively, for use within a printing engine, densitometers such as those described by Rushing in U.S. Pat. Nos. 6,567,171, 6,144,024, 6,222,176, 6,225,618, 6,229,972, 6,331,832, 6,671,052, and 6,791,485 are well suited. Other densitometers, as are known in the art, are also suitable.

Densitometer 671 is an example of a densitometer useful with various embodiments to monitor development of test patches, as is well known in the art. See for example U.S. Pat.

No. 5,649,266. Densitometer 671 is intended to measure the transmittance or reflectance density of a toned patch on receiver 46A to permit maintaining that density at a desired level. The example shown is a reflection densitometer. In this example, densitometer 671 includes light source 45, which can be an infrared emitting diode (IRED) that shines light that is reflected by toner image 57 on receiver 46A onto photosensor 81, e.g., a photodiode. The photodiode generates an electrical signal which varies directly with the flux of light received. The signal is to be converted to a density value reading. Filter 8 can be selectively placed in the incident light path ahead of photosensor 81, and can be a status A filter, as discussed above. As known in the art, the transmission density of filter 8 can be measured using a calibrated light source directly incident on filter 8 rather than using light source 45 and a reflector.

The size of the sample area required for densitometry measurements varies, depending on a number of factors such as the size of the aperture of the densitometer and the information desired. For example, microdensitometers are used to measure site-to-site variations in density of an image on a very small scale to allow the granularity of an image to be measured by determining the standard deviation of the density of an area having a nominally uniform density. Alternatively, densitometers also are used having an aperture area of several square centimeters. These allow low frequency variations in density to be determined using a single measurement. This allows image mottle to be determined. For simple determinations of image density, the area to be measured generally has a radius of at least 1 mm but not more than 5 mm.

The term module means a device or subsystem designed to perform a specific task in producing a printed image. For example, a development module in an electrophotographic printer would include a primary imaging member (PIM) such as a photoreceptive member and one or more development stations that would image-wise deposit marking or toner particles onto an electrostatic latent image on the PIM, thereby rendering it into a visible image. A module can be an integral component in a print engine. For example, a development module is usually a component of a larger assembly that includes writing transfer and fuser modules such as is known in the art. Alternatively, a module can be self contained and can be made in a manner so that they are attached to other modules to produce a print engine. Examples of such modules include scanners, glossers, inverters that will invert a sheet of paper or other receiver to allow duplex printing, inserters that allow sheets such as covers or preprinted receivers to be inserted into documents being printed at specific locations within a stack of printed receiver sheets, and finishers that can fold, stable, glue, etc. the printed documents.

A print engine includes sufficient modules to produce prints. For example, a black and white electrophotographic print engine would generally include at least one development module, a writer module, and a fuser module. Scanner and finishing modules can also be included if called for by the intended applications.

A print engine assembly, also referred to in the literature as a reproduction apparatus, includes a plurality of print engines that have been integrally coupled together in a manner to allow them to print in a desired manner. For example, print engine assemblies that include two print engines and an inverter module that are coupled together to increase productivity by allowing the first print engine to print on one side of a receiver, the receiver then fed into the inverter module which inverts the receiver and feeds the receiver into the second print engine that prints on the inverse side of the receiver, thereby printing a duplex image.

A digital print engine is a print engine wherein the image is written using digital electronics. Such print engines allow the image to be manipulated, image by image, thereby allowing each image to be changed. In contrast, an offset press relies on the image being printed using press plates. Once the press plate is made, it cannot be changed. An example of a digital print engine is an electrophotographic print engine wherein the electrostatic latent image is formed on the PIM by exposing the PIM using a laser scanner or LED array. Conversely, an electrophotographic apparatus that relies on forming a latent image by using a flash exposure to copy an original document would not be considered a digital print engine.

A digital print engine assembly is a print engine assembly that a plurality of print engines of which at least one is a digital print engine.

Contrast is defined as the maximum value of the slope curve of the density versus log of the exposure. The contrast of two prints is considered to be equal if they differ by less than 0.2 ergs/$cm^2$ and preferably by less than 0.1 ergs/$cm^2$.

Print engine 30 may include a controller or logic and control unit (LCU) (not shown). The LCU may be a computer, microprocessor, application specific integrated circuit (ASIC), digital circuitry, analog circuitry, or a combination or plurality thereof. The controller (LCU) may be operated according to a stored program for actuating the workstations within print engine 30, effecting overall control of print engine 30 and its various subsystems. The LCU may also be programmed to provide closed-loop control of the print engine 30 in response to signals from various sensors and encoders. Aspects of process control are described in U.S. Pat. No. 6,121,986 incorporated herein by this reference.

A primary charging station 38 in print engine 30 sensitizes PIM 32 by applying a uniform electrostatic corona charge, from high-voltage charging wires at a predetermined primary voltage, to a surface 32*a* of PIM 32. The output of charging station 38 may be regulated by a programmable voltage controller (not shown), which may in turn be controlled by the LCU to adjust this primary voltage, for example by controlling the electrical potential of a grid and thus controlling movement of the corona charge. Other forms of chargers, including brush or roller chargers, may also be used.

An image writer, such as exposure station 40 in print engine 30, projects light from a writer 40*a* to PIM 32. This light selectively dissipates the electrostatic charge on photoreceptive PIM 32 to form a latent electrostatic image of the document to be copied or printed. Writer 40*a* is preferably constructed as an array of light emitting diodes (LEDs), or alternatively as another light source such as a Laser or spatial light modulator. Writer 40*a* exposes individual picture elements (pixels) of PIM 32 with light at a regulated intensity and exposure, in the manner described below. The exposing light discharges selected pixel locations of the photoreceptor, so that the pattern of localized voltages across the photoreceptor corresponds to the image to be printed. An image is a pattern of physical light, which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

After exposure, the portion of PIM 32 bearing the latent charge images travels to a development station 42. Development station 42 includes a magnetic brush in juxtaposition to the PIM 32. Magnetic brush development stations are well known in the art, and are desirable in many applications; alternatively, other known types of development stations or devices may be used. Plural development stations 42 may be provided for developing images in plural gray scales, colors, or from toners of different physical characteristics. Full process color electrographic printing is accomplished by utilizing this process for each of four toner colors (e.g., black, cyan, magenta, yellow).

Upon the imaged portion of PIM 32 reaching development station 42, the LCU selectively activates development station 42 to apply toner to PIM 32 by moving backup roller 42*a* and PIM 32, into engagement with or close proximity to the magnetic brush. Alternatively, the magnetic brush may be moved toward PIM 32 to selectively engage PIM 32. In either case, charged toner particles on the magnetic brush are selectively attracted to the latent image patterns present on PIM 32, developing those image patterns. As the exposed photoreceptor passes the developing station, toner is attracted to pixel locations of the photoreceptor and as a result, a pattern of toner corresponding to the image to be printed appears on the photoreceptor. As known in the art, conductor portions of development station 42, such as conductive applicator cylinders, are biased to act as electrodes. The electrodes are connected to a variable supply voltage, which is regulated by a programmable controller in response to the LCU, by way of which the development process is controlled.

Development station 42 may contain a two-component developer mix, which includes a dry mixture of toner and carrier particles. Typically the carrier preferably includes high coercivity (hard magnetic) ferrite particles. As a non-limiting example, the carrier particles may have a volume-weighted diameter of approximately 30μ. The dry toner particles are substantially smaller, on the order of 6μ to 15μ in volume-weighted diameter. Development station 42 may include an applicator having a rotatable magnetic core within a shell, which also may be rotatably driven by a motor or other suitable driving means. Relative rotation of the core and shell moves the developer through a development zone in the presence of an electrical field. In the course of development, the toner selectively electrostatically adheres to PIM 32 to develop the electrostatic images thereon and the carrier material remains at development station 42. As toner is depleted from the development station due to the development of the electrostatic image, additional toner may be periodically introduced by a toner auger (not shown) into development station 42 to be mixed with the carrier particles to maintain a uniform amount of development mixture. This development mixture is controlled in accordance with various development control processes. Single component developer stations, as well as conventional liquid toner development stations, may also be used.

A transfer station 44 in printing machine 10 moves a receiver sheet 46 into engagement with the PIM 32, in registration with a developed image to transfer the developed image to receiver sheet 46. Receiver sheets 46 may be plain or coated paper, plastic, or another medium capable of being handled by the print engine 30. Typically, transfer station 44 includes a charging device for electrostatically biasing movement of the toner particles from PIM 32 to receiver sheet 46. In this example, the biasing device is roller 48, which engages the back of sheet 46 and which may be connected to a programmable voltage controller that operates in a constant current mode during transfer. Alternatively, an intermediate member may have the image transferred to it and the image may then be transferred to receiver sheet 46. After transfer of the toner image to receiver sheet 46, sheet 46 is detacked from PIM 32 and transported to fuser station 50 where the image is fixed onto sheet 46, typically by the application of heat and/or pressure. Alternatively, the image may be fixed to sheet 46 at the time of transfer.

A cleaning station 52, such as a brush, blade, or web is also located beyond transfer station 44, and removes residual toner from PIM 32. A pre-clean charger (not shown) may be located before or at cleaning station 52 to assist in this cleaning. After cleaning, this portion of PIM 32 is then ready for recharging and re-exposure. Of course, other portions of PIM 32 are simultaneously located at the various workstations of print engine 30, so that the printing process may be carried out in a substantially continuous manner.

A controller provides overall control of the apparatus and its various subsystems with the assistance of one or more sensors, which may be used to gather control process, input data. One example of a sensor is belt position sensor 54.

Figure 2:
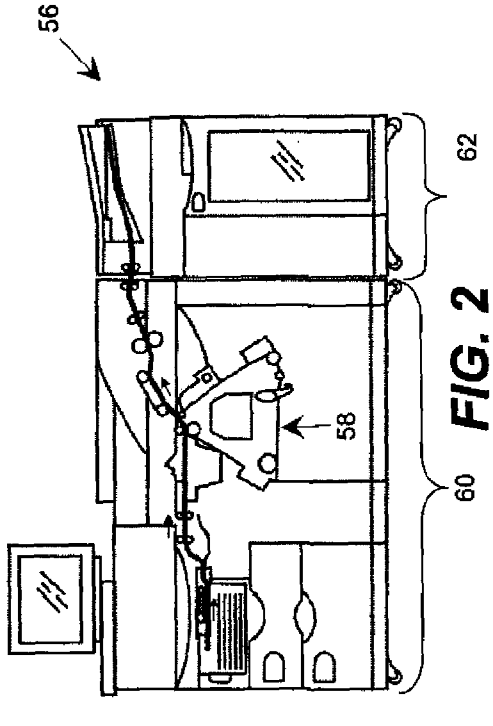
FIG. 2 schematically illustrates an embodiment of a reproduction apparatus having a first print engine.

FIG. 2 schematically illustrates an embodiment of a reproduction apparatus 56 having a first print engine 58 that is capable of printing one or a multiple of colors. The embodied reproduction apparatus will have a particular throughput, which may be measured in pages per minute (ppm). As explained above, it would be desirable to be able to significantly increase the throughput of such a reproduction apparatus 56 without having to purchase an entire second reproduction apparatus. It would also be desirable to increase the throughput of reproduction apparatus 56 without having to scrap apparatus 56 and replacing it with an entire new machine.

Quite often, reproduction apparatus 56 is made up of modular components. For example, the print engine 58 is housed within a main cabinet 60 that is coupled to a finishing unit 62. For simplicity, only a single finishing device 62 is shown, however, it should be understood that multiple finishing devices providing a variety of finishing functionality are known to those skilled in the art and may be used in place of a single finishing device. Depending on its configuration, the finishing device 62 may provide stapling, hole punching, trimming, cutting, slicing, stacking, paper insertion, collation, sorting, and binding.

Figure 3A:
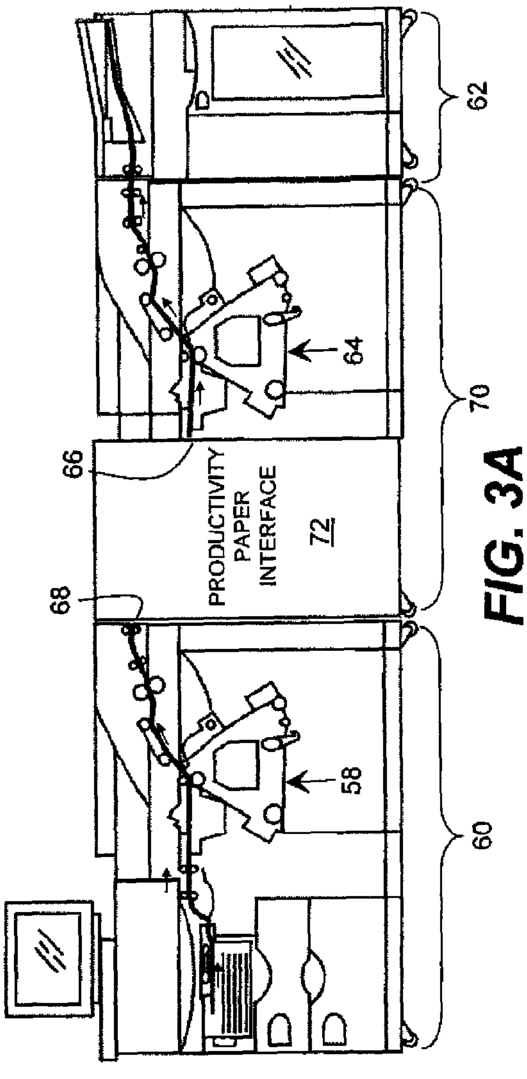
FIGS. 3A-3C schematically illustrate embodiments of a reproduction apparatus having a first print engine and a tandem second print engine from a productivity module.
Figure 3B:
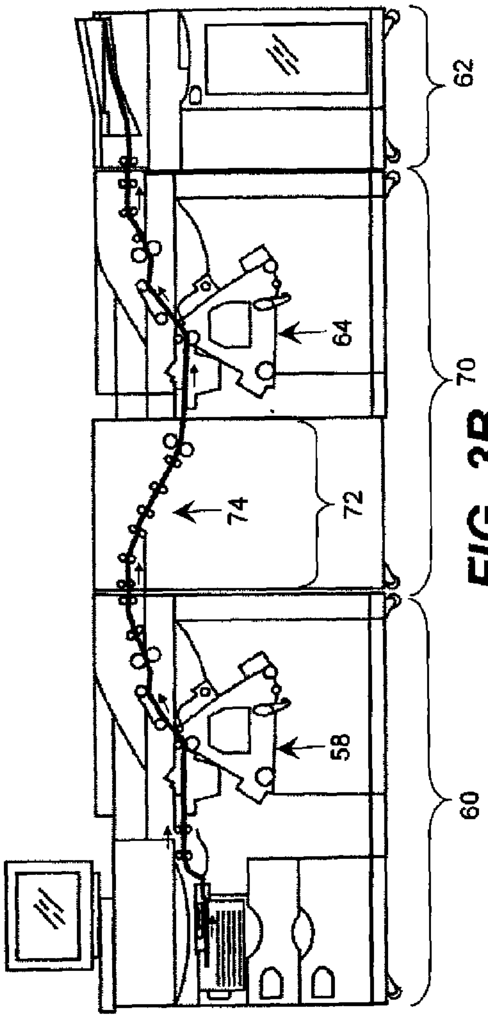
Figure 3C:
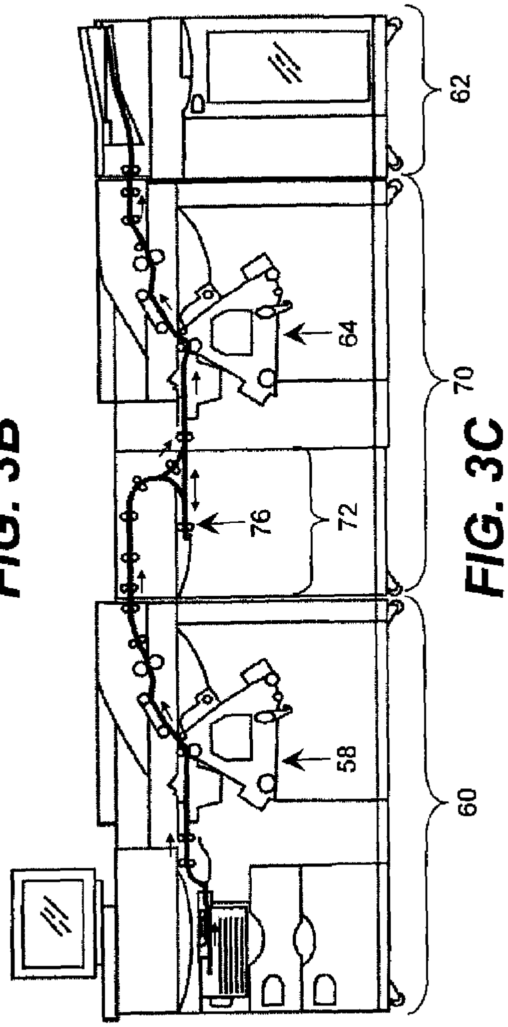

As FIG. 3A schematically illustrates, a second print engine 64 may be inserted in-line with the first print engine 58 and in-between the first print engine 58 and the finishing device 62 formerly coupled to the first print engine 58. The second print engine 64 may have an input paper path point 66 which does not align with the output paper path point 68 from the first print engine 58. Additionally, or optionally, it may be desirable to invert the receiver sheets from the first print engine 58 prior to running them through the second print engine (in the case of duplex prints). In such instances, the productivity module 70 which is inserted between the first print engine 58 and the at least one finisher 62 may have a productivity paper interface 72. Some embodiments of a productivity paper interface 72 may provide for matching 74 of differing output and input paper heights, as illustrated in the embodiment of FIG. 3B. Other embodiments of a productivity paper interface 72 may provide for inversion 76 of receiver sheets, as illustrated in the embodiment of FIG. 3C.

Providing users with the option to re-use their existing equipment by inserting a productivity module 70 between their first print engine 58 and their one or more finishing devices 62 can be economically attractive since the second print engine 64 of the productivity module 70 does not need to come equipped with the input paper handling drawers coupled to the first print engine 58. Furthermore, the second print engine 64 can be based on the existing technology of the first print engine 58 with control modifications which will be described in more detail below to facilitate synchronization between the first and second print engines.

Figure 4:
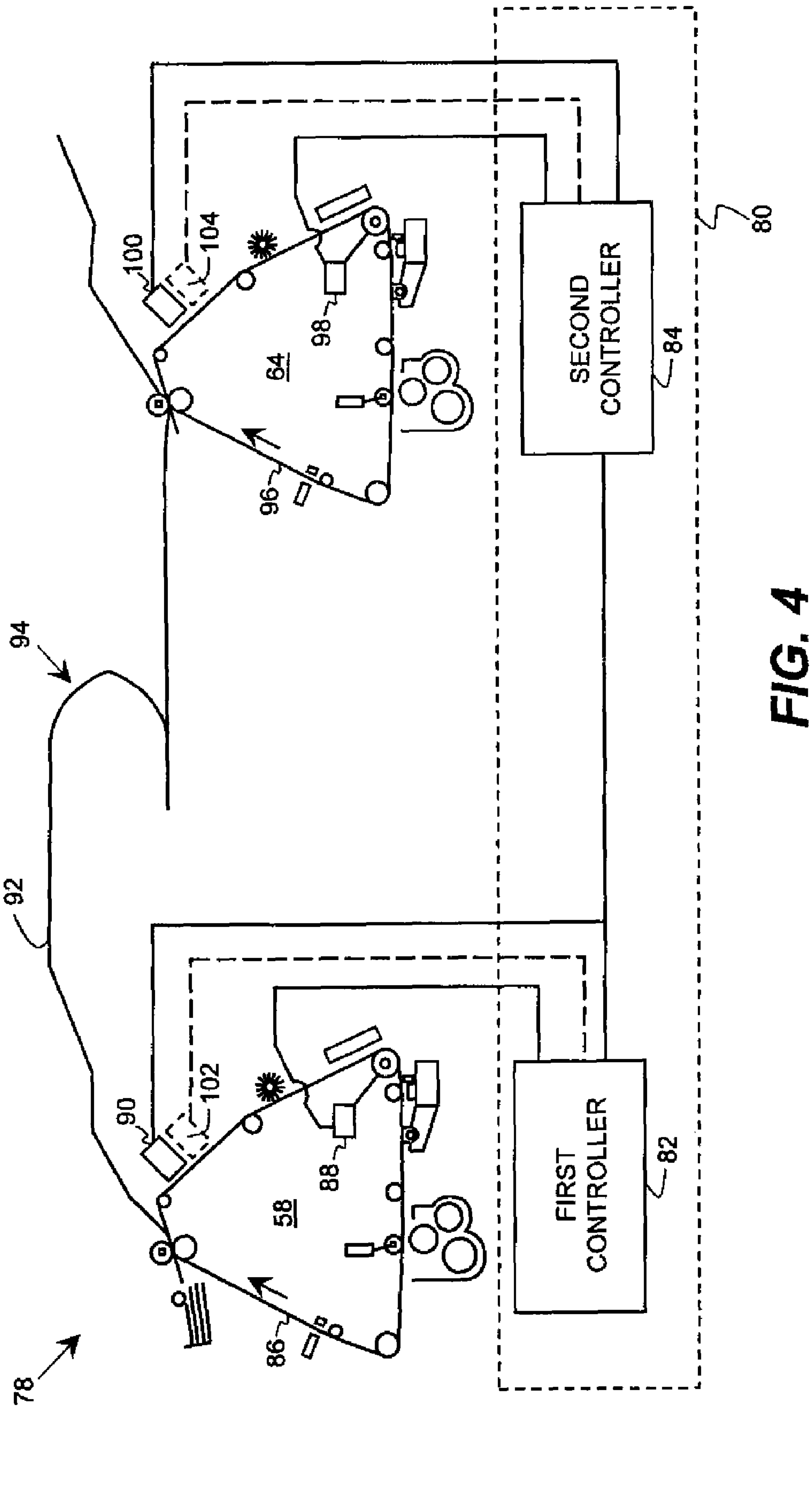
FIG. 4 schematically illustrates an embodiment of a reproduction or printing apparatus having embodiments of a first and second print engines.

FIG. 4 schematically illustrates an embodiment of a reproduction apparatus 78 having embodiments of first and second print engines 58, 64 which are synchronized by a controller 80. Controller 80 may be a computer, a microprocessor, an application specific integrated circuit, digital circuitry, analog circuitry, or any combination and/or plurality thereof. In this embodiment, the controller 80 includes a first controller 82 and a second controller 84. Optionally, in other embodiments, the controller 80 could be a single controller as indicated by the dashed line for controller 80. The first print engine 58 has a first primary imaging member (PIM) 86, the features of which have been discussed above with regard to the PIM of FIG. 1. The first PIM 86 also preferably has a plurality of frame markers corresponding to a plurality of frames on the PIM 86. In some embodiments, the frame markers may be holes or perforations in the PIM 86 which an optical sensor can detect. In other embodiments, the frame markers may be reflective or diffuse areas on the PIM, which an optical sensor can detect. Other types of frame markers will be apparent to those skilled in the art and are intended to be included within the scope of this specification. The first print engine 58 also has a first motor 88 coupled to the first PIM 86 for moving the first PIM when enabled. As used here, the term "enabled" refers to embodiments where the first motor 88 may be dialed in to one or more desired speeds as opposed to just an on/off operation. Other embodiments, however, may selectively enable the first motor 88 in an on/off fashion or in a pulse-width-modulation fashion.

The first controller 82 is coupled to the first motor 88 and is configured to selectively enable the first motor 88 (for example, by setting the motor for a desired speed, by turning the motor on, and/or by pulse-width-modulating an input to the motor). A first frame sensor 90 is also coupled to the first controller 82 and configured to provide a first frame signal, based on the first PIM's plurality of frame markers, to the first controller 82.

A second print engine 64 is coupled to the first print engine 58, in this embodiment, by a paper path 92 having an inverter 94. The second print engine 64 has a second primary imaging member (PIM) 96, the features of which have been discussed above with regard to the PIM of FIG. 1. The second PIM 96 also preferably has a plurality of frame markers corresponding to a plurality of frames on the PIM 96. In some embodiments, the frame markers may be holes or perforations in the PIM 96, which an optical sensor can detect. In other embodiments, the frame markers may be reflective or diffuse areas on the PIM which an optical sensor can detect. Other types of frame markers will be apparent to those skilled in the art and are intended to be included within the scope of this specification. The second print engine 64 also has a second motor 98 coupled to the second PIM 96 for moving the second PIM 96 when enabled. As used here, the term "enabled" refers to embodiments where the second motor 98 may be dialed in to one or more desired speeds as opposed to just an on/off operation. Other embodiments, however, may selectively enable the second motor 98 in a pulse-width-modulation fashion.

The second controller 84 is coupled to the second motor 98 and is configured to selectively enable the second motor 98 (for example, by setting the motor for a desired speed, or by pulse-width-modulating an input to the motor). A second frame sensor 100 is also coupled to the second controller 84 and configured to provide a second frame signal, based on the second PIM's plurality of frame markers, to the second controller 84. The second controller 84 is also coupled to the first frame sensor 90 either directly as illustrated or indirectly via the first controller 82 which may be configured to pass data from the first frame sensor 90 to the second controller 84.

While the operation of each individual print engine 58 and 64 has been described on its own, the second controller 84 is also configured to synchronize the first and second print engines 58, 64 on a frame-by-frame basis. Optionally, the second controller 84 may also be configured to synchronize a first PIM splice seam from the first PIM 86 with a second PIM splice seam from the second PIM 96. In the embodiments that synchronize the PIM splice seams, the first print engine 58 may have a first splice sensor 102 and the second print engine 64 may have a second splice sensor 104. In other embodiments, the frame sensors 90, 100 may be configured to double as splice sensors.

The quality of images produced on different print engines can be found to be objectionable if produced on different print engines even if the print engines are nominally the same, e.g. the same model produced by the same manufacturer. For example, the images can have slightly different sizes, densities or contrasts. These variations, even if small, can be quite noticeable if the images are compared closely. For example, slight variations in the color of two prints of identical scenes are quite noticeable if the prints are compared side-to-side. The problem becomes even more severe if images are printed on the same receiver sheet. For example, even in duplex printing, if the image on one side of a receiver sheet differs in size from that on the other, it will be readily visible. If a spot color image is printed in a designated area on a preprinted receiver sheet and extends beyond its border or is supposed to but up to a printed area but is slightly too small and leaves a white line between the regions, it will be objectionable. If color separations produced on separate print engines within a print engine assembly vary slightly in size, the resulting print will be blurry and the desired color balance will not be achieved.

Another problem can occur if densities and contrasts are not properly matched is that information in the low density, often referred to as the toe in the literature, and high density, often referred to as the shoulder in the literature, can be lost. For example, if the contrast between similar prints made on two print engines differs, dark objects in a shadowy region of one print may be discernible but lost in the other. Similarly, low density objects may be visible in one print but lost in the other. Such variations are strongly objectionable and can result in a print job being rejected by a customer.

It is clearly important that certain image quality attributes, including size, print density, and contrast, match for prints made on separate print engines if those prints are subject to close scrutiny, as would be the case when a print made on a receiver sheet is produced on separate print engines. Specifically, the reflection density and the contrast of the prints need to closely match or the prints will be found to be objectionable to a customer. Even prints produced on two nominally identical digital printing presses such as electrophotographic printing presses described herein can vary in density and contrast due to variations in the photoresponse of the PIM, variations in the charge or size of the marking particles, colorant dispersion variations within the batches of marking particles used in the separate engines, etc. It is clear that a method is needed to allow comparable prints to be produced on a plurality of engines. For example if one of the print engines prints a first side and the other prints a second side then the two sides must be corrected so that they are not objectionable by the customer when seen together next to each other.

The optical density, preferably the reflection density, of an image formed on print engine 58 is measured to give a measurement to be used in the image quality matching method. In one embodiment the optical density is measured in an area corresponding to regions having a difference in optical, preferably reflection, density of at least 0.7 between regions of low and high densities. In one embodiment it is preferable to measure at least three regions corresponding to three distinct densities including a region having a low and a high optical density that differ by 0.07 and a region having an optical density between the low and a high optical density extremes. These regions can be of any area sufficient to yield an accurate reading but must not be too large. For simple determinations of image density, the area to be measured generally has a radius of at least 1 mm, but not more than 5 mm, when measuring the quality is a sheet using a microdensitometer. The size of the regions sample area that is required for densitometry measurements varies, depending on a number of factors including the size of the aperture of the densitometer and the information desired.

While the reflection densities of the unfused images can be used for this purpose, it is preferable to measure the reflection densities of the fused prints. Moreover, it is even more preferable to measure the reflection densities obtained from a specific test print having distinct regions of such reflection densities. It is possible, although somewhat less desirable, to match single density regions on the prints. Similar measurements are made on print engine 64. If the densities are not comparable, for example, if the densities of each region of the print made on print engine 58 differs by more than 0.03 from that made on print engine 64, appropriate corrections are made. If single densities are matched, the corrections can be effected simply by adjusting the potential of the PIM prior to exposure by adjusting its initial charge. This is accomplished by raising the bias of the grid of a grid controlled charger 38 or the bias of a roller charger corresponding to 38. Alternatively, the bias on development roller 42 can be adjusted. The latter is less desirable in many situations because too great an adjustment can lead to background in white areas or deposition of carrier particles.

In one embodiment of the method, the potential of the PIM is first adjusted so that the maximum reflection density Dmax of the prints made on each of the two print engines matches, preferably to within 0.03. These measurements are done at particular optical densities. In another example the densities differ by less than 0.03 at a transmission density between 0.6 and 0.7. If they do not match, the initial bias on the PIM in the print engine having the lower Dmax is increased so that they do match. Lower densities are then matched by adjusting either the exposure time or the exposure intensity of the LED array or laser scanner in the writer 40. While manual adjustment can be made, if is preferable that the writer is adjusted automatically by either using a mathematical algorithm that translates the density at each of the density levels to the required exposure level or a lookup table that sets the exposure to the desired density. Thus, the control module of each print engine would automatically adjust the writer to result in the appropriate potential on the photoreceptor. This algorithm or lookup table should, of course, be initially set for each batch of developer by using an appropriate test target such as a density step wedge.

Alternatively, the optical density can be measured using transmission densitometry if necessary. However, PIM are often colored or, in the case of a drum PIM, opaque. Moreover, as prints are generally observed via reflection, reflection densitometry is often used.

For the purpose of this invention, the print densities are adjusted until they are substantially equal. Substantially equal means that the differences in optical density, preferably the reflection densities, of corresponding areas of the prints made on a plurality of print engines differ by less than 0.05 and preferably by less than 0.03. It is preferable that these density differences refer to reflection densities measured on the prints fused in the corresponding engines. Set points refer to the potential applied to the shell of the development station and the potential on the PIM prior to exposure.

It should be noted that this technique is suited to matching the densities and contrast of black and white prints. It is also suitable for adjusting the densities and contrasts of single color prints such as those of images including regions of a single color such as the separation of a subtractive primary color or a specific custom or spot color such as used in a logo.

In an alternative mode of practicing this invention, the potential of the PIM is measured using a device such as an electrometer after formation of the electrostatic latent image. While the potential of an area corresponding to a single density such as the Dmax region can be used in this invention, it is preferable to measure the potential of the PIM corresponding to at least 2 distinct densities and more preferably 3 or more distinct densities. As discussed previously in this disclosure, the potential can then be adjusted by varying the time or the intensity of the exposure so that the potentials on the primary imaging members of print engines 58 and 62 match so that the final print density varies by less than 0.03. Adjustments to the writer are made as described earlier in this disclosure. This method is disadvantaged compared to measuring the densities of the prints directly because the customer sees the final print, whereas this method measures the potential of the latent image. However, it does eliminate the need for making wasted prints.

Image quality matching has been described using electrophotographic digital print engines, preferably electrophotographic digital print engine assemblies, but it could be applied to other types of digital print engines and digital print engine assemblies. For example, in the art known as ionography or electrostatography, electrostatic latent images are formed by directly depositing ions onto a PIM in the form of a dielectric support member using a corona charger in the form of a needle. The latent image is rendered visible and printing continues in a method very similar to that used in electrophotography. Adjustments to the potential on the PIM can be made by varying the output of the charger or changing the potential on the development station, as discussed herein.

In an alternative mode of practicing this invention, the digital print engine includes a module that produces prints using known ink jet technology. Although ink jet technology whereby ink droplets are jetted onto a PIM and the resulting image is subsequently transferred to a receiver, in most ink jet engines, the receiver and the PIM are one and the same.

Ink jet engines principally fall into one of two classifications: drop on demand whereby ink droplets are produced by either applied a thermal or piezoelectric pulse to the ink in the head or using a continuous stream whereby ink is continuously jetted from the head towards the receiver. Excess ink is deflected by exposing the stream to a potential that deflects the stream from the receiver towards a gutter and recirculated into the ink reservoir.

To vary the density in a drop-on-demand ink jet print engine, one needs to vary the thermal or piezoelectric pulse. This is done by inputting the information to the central processing unit that controls the droplets presently. To change the density, the droplet size is uniformly adjusted across density ranges. To vary the contrast, the droplet size is varied as a function of the density. Similarly, to vary the density of an image produced using a continuous ink jet print engine, the deflection potential is varied. A uniform variation would produce a uniform shift in density whereas a variation that depends on the density of the image would vary the contrast.

While the desired potential differences can be produced using known techniques such as inputting the output from the densitometer into the central processing unit where a lookup table is then used to set the potentials, the relatively small corrections that are anticipated can be achieved simply by using the output potential to vary the driving potential that controls the amount of ink that is jetted from the ink jet head impacting the receiver. The use of an input signal to control a process is well known in the art of electronics.

An image quality matching method is used to match the optical density of single prints produced on multiple print engines by first sensing the optical density of a first image produced on a first print engine and then sensing the optical density of a second image produced on a second print engine before comparing the optical densities and determining if they are substantially equal. If they are not equal set points and exposures are adjusted on one or both print engines until the differences between the optical densities is less than 0.05, preferably 0.03. The density is changed by adjusting the initial voltage on the primary imaging member of at least one print engine and/or by adjusting the exposure of the primary imaging member of at least one print engine. Alternatively the density is changed by adjusting the voltage on the development station of at least one print engine.

One embodiment of the method uses a contrast between single color images produced on separate print engines by first sensing the optical density of a first image produced on a first print engine of at least two separate areas having an optical density of at least 0.7 and sensing the optical densities of a second image of a corresponding color in regions of the second print, corresponding to the same optical densities of the image produced on the first print engine, produced on a second print engine before comparing the optical densities and determining if they are substantially equal to within 0.03 and if necessary to correct inequalities, varying the potential initially applied to the PIM of the second print engine, the bias applied to the development station, and the exposure in the second print engine so as to match the densities produced by the second print engine to those produced by the first print engine. In one embodiment there are at least three optical densities are measured and the optical densities used to compare can be reflection densities. This method can be applied to black and white, or single color, as well as color, prints.

The image densities produced on a plurality of print engines are compared by determining the output voltage of a first densitometer used to measure the transmission density of a known filter within the first print engine and the output voltage of a second densitometer used to measure the transmission density of a known filter within the second print engine and then compensating the output voltage from the first densitometer in the first print engine for the output voltage for the second densitometer in the second print engine. In another embodiment matching the optical density of single prints produced on multiple print engines by sensing the potential of a first latent image produced on the PIM of a first print engine and on a second print engine before comparing the potentials and determining if they are substantially equal and adjusting the set points on one or both print engines until the potentials are substantially equal.

The invention has been described in detail with particular reference to certain preferred embodiments thereof, but it will be understood that variations and modifications can be effected within the spirit and scope of the invention.

What is claimed is:

1. A method of matching the optical density of prints produced on a print engine assembly including a first and a second print engine, one of which is an inkjet print engine, comprising:

providing the first and second print engines, each including a respective densitometer;

measuring the transmission density of a known filter with the densitometer of the first print engine to provide a first output voltage;

measuring the transmission density of the known filter with the densitometer of the second print engine to provide a second output voltage;

comparing the first and second output voltages;

based on the comparison, compensating the output voltage from the densitometer in the first print engine for the output voltage for the densitometer in the second print engine;

sensing the optical density of a first image area of a first image produced by the first print engine using the densitometer in the first print engine after the compensation step;

sensing the optical density of a second image area of a second image produced by the inkjet print engine using the densitometer in the second print engine after the compensation step;

comparing the sensed optical densities of the first image area and the second image area and determining if they are substantially equal; and if the optical density difference is greater than 0.03 then adjusting one or more set points on the inkjet print engine until the optical densities of the first image area and the second image area differ by less than 0.03.

2. The method according to claim 1, wherein the differences between optical densities differ by less than 0.03 at a transmission density between 0.6 and 0.7.

3. The method according to claim 1, wherein the adjusting step includes varying the one of a thermal or piezoelectric pulse.

4. The method according to claim 3, wherein the sensing step includes measuring the optical density as a reflection density in two or more regions that have a difference in reflection density of at least 0.7 between the region of low density and the region of high density on each print and the adjusting step includes changing the density by adjusting the exposure of the primary imaging member of at least one print engine.

5. The method according to claim 4, wherein the sensing step further includes measuring at least three regions corresponding to three distinct densities including a region having a low and a high optical density that differs by 0.07 and a region having an optical density between the low and a high optical density extremes.

6. The method according to claim 4, wherein the adjusting step further includes first adjusting the potential of the primary imaging member to test if a maximum reflection density Dmax of the prints made on each of the two print engines differ by 0.03 or less and if they do not match first increasing the initial bias on the primary imaging member in the print engine having the lower Dmax and then adjusting either the exposure time or the exposure intensity of the LED array or laser scanner in the writer to match the lower densities.

7. The method according to claim 1, wherein the adjusting step further includes changing the density by controlling a droplet size of at least one inkjet print engine uniformly across density ranges.

8. The method according to claim 1, wherein the adjusting step further includes automatically controlling a droplet size of at least one inkjet print engine by one or more of using a mathematical algorithm that translates the density at each of the density levels to the required droplet size and a lookup table that sets the droplet size for a desired density.

9. The method according to claim 8, further including producing desired potential differences by inputting a densitometer output into a central processing unit having a lookup table used to set potentials by using the output potential to vary the driving potential that controls the droplet size by controlling an amount of ink jetted from an ink jet printer head.

10. A method of matching the contrast of single-color images produced on first and second print engines, at least one of which is an inkjet print engine:

providing the first and second print engines, each including a respective densitometer;

measuring the transmission density of a known filter with the densitometer of the first print engine to provide a first output voltage;

measuring the transmission density of the known filter with the densitometer of the second print engine to provide a second output voltage;

comparing the first and second output voltages;

based on the comparison, compensating the output voltage from the densitometer in the first print engine for the output voltage for the densitometer in the second print engine;

sensing an optical density of at least two areas of a first image produced on the first print engine, wherein the at least two areas have an optical density difference of at least 0.7;

sensing an optical density of at least two areas of a second image produced on the second inkjet print engine, the at least two areas of the second image having optical densities corresponding to the optical densities of the at least two areas of the first image;

comparing the corresponding sensed optical densities of the first and second images and determining if they are substantially equal; and if there is a difference of greater than 0.03 varying a potential initially applied to a primary imaging member of the second print engine, such that the contrast is varied by varying a droplet size as a function of the density so that the optical densities differ by less than 0.03.

11. The method according to claim 10, wherein the optical densities are reflection densities.

12. The method according to claim 10, wherein at least three optical densities are measured.

13. A method of matching the contrast of single-color images produced on separate print engines of a print engine assembly, the assembly including one or more inkjet print engines, the method comprising:

providing the print engines, each including a respective densitometer;

measuring the transmission density of a known filter with the densitometer of each print engine to provide a respective output voltage;

comparing the respective output voltages;

based on the comparison, compensating the output voltage from at least one of the densitometers for the output voltage for at least one other of the densitometers;

sensing a post-exposure potential in at least two areas of a first image produced on a first print engine such that the at least two areas would have an optical density difference of at least 0.7 on the fused print;

sensing a post-exposure potential in at least two areas of a second image produced on a second print engine, the at least two areas of the second image having optical densities corresponding to the optical densities of the at least two areas of the first image;

comparing the optical densities of the first image area and the second image area and determining if they are sufficiently close so as to produce prints having substantially equal densities in the appropriate areas; and if the optical densities of one image area produced on the first print engine and of one image area produced on the second print engine differ by more than 0.03 varying one or more of an potential initially applied to a primary imaging member, a bias applied to a development station, and an exposure in the first print engine so as to match the optical densities of the prints produced by the second print engine to those produced by the first print engine so that they differ by less than 0.03.

14. The method according to claim 13, wherein the differences between optical densities differ by less than 0.03 at a transmission density between 0.6 and 0.7.

15. The method according to claim 13, wherein the sensing step further includes varying the one of a thermal or piezoelectric pulse in the second engine.

16. The method according to claim 13, further including adjusting the exposure by automatically controlling a droplet size of at least one inkjet print engine by one or more of using a mathematical algorithm that translates the density at each of the density levels to the required droplet size and a lookup table that sets the droplet size for a desired density.

17. The method according to claim 13, further including producing a desired potential differences by inputting a densitometer output into a central processing unit having a lookup table used to set potentials by using the output potential to vary the driving potential that controls the droplet size by controlling an amount of ink jetted from an ink jet printer head.

* * * * *